(12) United States Patent
Schwind et al.

(10) Patent No.: US 8,017,703 B2
(45) Date of Patent: Sep. 13, 2011

(54) CONTINUOUS FEED OF AUXILIARIES FOR THE POLYMERIZATION OF OLEFINS

(75) Inventors: Jürgen Schwind, Bornheim (DE); Horst Klassen, Erftstadt (DE); Gerald Lutz, Köln (DE); Robert Gelinas, Lake Charles, LA (US); Klaus Berhalter, Bornheim (DE); Ursula Krügers, Brühl (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 12/733,454

(22) PCT Filed: Sep. 2, 2008

(86) PCT No.: PCT/EP2008/007164
§ 371 (c)(1),
(2), (4) Date: Jun. 2, 2010

(87) PCT Pub. No.: WO2009/030460
PCT Pub. Date: Mar. 12, 2009

(65) Prior Publication Data
US 2010/0256320 A1    Oct. 7, 2010

Related U.S. Application Data

(60) Provisional application No. 60/999,435, filed on Oct. 18, 2007.

(30) Foreign Application Priority Data

Sep. 6, 2007  (DE) .......................... 10 2007 042 252

(51) Int. Cl.
  *C08F 2/34* (2006.01)
  *C08F 2/12* (2006.01)
  *C08F 10/02* (2006.01)
(52) U.S. Cl. .......................................... 526/74; 526/88
(58) Field of Classification Search .................. 526/74, 526/88, 919
See application file for complete search history.

(56) References Cited

U.S. PATENT DOCUMENTS 5,034,480 A * 7/1991 Funk et al. ...................... 526/74

FOREIGN PATENT DOCUMENTS

| DE | 43 0 7 649 | 9/1993 |
| EP | 0 229 368 | 11/1990 |
| EP | 0 571 826 | 2/1997 |
| EP | 0 811 638 | 10/1997 |
| WO | WO 00/66640 | 9/2000 |
| WO | WO 2005/003184 | 1/2005 |

OTHER PUBLICATIONS

Safety Data Sheet for Shell ONDINA, pp. 1-7, Issued Feb. 27, 1997.*

* cited by examiner

*Primary Examiner* — Fred M Teskin
(74) *Attorney, Agent, or Firm* — Dilworth IP, LLC

(57) ABSTRACT

Continuous feed of auxiliaries for the polymerization reaction of ethylene, propene, and other higher homologous olefins in the preparation of homo- and copolymers, avoiding production of inhomogeneities, such as lumps or chunks which are present because the condition of the auxiliaries is not suitable for precise metering, becomes possible when auxiliaries in paste or solid form, in particular antistatic auxiliaries, are subjected, prior to feed, to a heat treatment in the presence of a solvent at a temperature of from 20 to 80° C., and then recooled, and then fed to the polymerization reaction.

6 Claims, No Drawings

CONTINUOUS FEED OF AUXILIARIES FOR THE POLYMERIZATION OF OLEFINS

CROSS-REFERENCE TO RELATED APPLICATIONS

This application is the U.S. national stage under 35 U.S.C. §371 of International Application PCT/EP2008/007164, filed Sep. 2, 2008, claiming priority to DE Patent Application No. 10 2007 042 252.2, filed Sep. 6, 2007, and provisional U.S. Appl. No. 60/999,435, filed Oct. 18, 2007; the disclosures of International Application PCT/EP2008/007164, DE Patent Application No. 10 2007 042 252.2, and provisional U.S. Appl. No. 60/999,435, each as filed, are incorporated herein by reference.

The present invention relates to a process for the continuous metering of auxiliaries for the polymerization reaction of ethylene, propene, and other higher homologous olefins in the preparation of homo- and copolymers, avoiding production of inhomogeneities, such as lumps or chunks which are present because the condition of the auxiliaries is not suitable for precise metering.

Gas-phase polymerization processes are cost-effective processes for the polymerization reaction of ethylene and propene and for the copolymerization reaction of ethylene or propene with $C_3$-$C_8$ α-olefins. These gas-phase polymerization processes can either be gas-phase fluidized-bed processes or stirred gas-phase processes. These processes are described by way of example in EP-A-0 571 826.

A characteristic of the gas-phase process is that the bed composed of polymerizing polymer particles is maintained in a fluidized state from below, either via a gas mixture or via stirring. A gas mixture also dissipates the heat liberated in the polymerization reaction from the reactor. The reaction gas is cooled in a heat exchanger situated outside the reactor, and is returned to the reactor (gas circuit).

In order that the polymerization reaction, which runs continuously and is mostly of prolonged duration, is maintained in a consistently ideal condition over this long period, without product-quality variations, the reaction mixture composed of gas and of various solids generally has to receive feeds of small amounts of other auxiliaries which can inhibit caking on the reactor walls or electrostatic charging of the particles maintained in constant motion in the fluidized bed, or blocking of supply lines. The problem with these auxiliaries, however, is that their metering is not uniformly consistent, particularly if their condition prevents continuous feed of small and very small amounts. The problem becomes critical in particular if the polymerization reaction is preparing a polymer for subsequent use for medical purposes or for direct food contact. The specific requirement in the case of such polymers is to exclude the presence of even the smallest amounts of any auxiliaries not expressly approved for the use of the actual polymer in accordance with regulations. The problem was then to take an auxiliary approved for the application and convert it to a form capable of metering, and specifically in such a way that all of the auxiliaries used here are likewise approved auxiliaries.

The present invention was therefore based on the object of finding a method which, irrespective of available apparatus, i.e. using the existing equipment on the plant, permits the uniform and continuous feed of auxiliaries in paste or solid form to the polymerization reaction in the gas phase, without thereby producing inhomogeneities, such as chunks or lumps. Specifically, these cause undesirable production stoppages, and the result of the desired solution is therefore intended to be longer stoppage-free running time of polymerization plants, increased quality of polymerization products, and lower costs for maintenance and repair.

This object is achieved via a continuous feed of generic type mentioned in the introduction, the characterizing feature of which is that auxiliaries in paste or solid form, in particular antistatic auxiliaries, are subjected, prior to feed, to a heat treatment in the presence of a solvent at a temperature of from 20 to 60° C., preferably from 30 to 50° C., and then recooled, and then fed to the polymerization reaction.

The duration of the heat treatment here is intended to be in the range from 10 s to 20 min, preferably from 20 s to 10 min, with cooling to ambient temperature after the heat treatment.

The feed of the antistatic auxiliary optionally takes place directly by way of a pump into the polymerization reactor or into the gas circuit. In the case of low external temperatures, the assemblies have to be brought to an appropriate temperature.

The inventive process can be carried out in gas-phase fluidized-bed reactors, in stirred gas-phase reactors, and also in suspension reactors, for preparation of PE and PP.

The description below relates to the stirred gas-phase process, but its principles can also be applied to the other processes.

The reactor gas circulated in the gas circuit is fed at the base of the reactor, and passes through the reactor, and is drawn off at the upper end, or top, of the reactor. The gas circuit usually involves a mixture composed of propylene or ethylene and nitrogen. Hydrogen is metered in as molecular-weight regulator.

Other reaction gases that can be added are comonomers, e.g. 1-butene. The gas circuit serves to dissipate the heat of the polymerization reaction and to keep the reaction temperature constant. It is therefore necessary to generate a uniform distribution of the reactor gas in the polymer, and this is achieved, for example, via a fluidized bed or a stirrer or fluid circulation. The presence of lumps, or deposits, etc. would considerably disrupt the system.

Catalysts that can be used are any of the known catalysts usually used for ethylene (co)polymerization reactions and propene (co)polymerization reactions, examples therefore being Ziegler-Natta catalysts, chromium catalysts, or metallocene catalysts. These catalysts are known to the person skilled in the art, as also are the required or advantageous cocatalysts and activators. These catalysts are generally used in supported form, for example on support materials such as inorganic oxides (e.g. MgO, silica gel or magnesium chloride), or organic polymers (e.g. polyethylene particles).

The following antistatic auxiliaries can be used in the invention: antistatic agents approved for the food sector and medical applications, e.g. GRINDSTED PGE O 80/D, a polyglycerol ester which is prepared from edible treated vegetable fatty acid esters and is marketed by the company Danisco, and the antistatic agent ATMER 163 or the antistatic agents OCTASTAT 2000, 2500, 3000 and 5000 from the company Innospec.

The invention preferably uses white oil as solvent. The term white oil in the invention is intended to mean a particularly high-specification mixture composed of paraffin oils which is a white oil approved for medical purposes, with a suitable viscosity. The amount of white oil in the invention is in the range from 70 to 95% by weight, preferably from 80 to 92% by weight, particularly preferably from 85 to 90% by weight, based in each case on the total weight of the mixture composed of auxiliary and white oil.

The example below provides evidence of the effect of an antistatic agent in the invention, first subjected to heat treatment and then fed to the polymerization reaction of a randomcopolymer product (ethylene, propylene, hydrogen) whose melt flow rate MFR is in the range from 1 to 40 g/10 min, in the presence of a Ziegler-Natta catalyst or metallocene catalyst, in the gas-phase process.

Inventive Example 1

The substance Grindsted PGE 0 80/D (=antistatic auxiliary), permitted in the medical and food sector, cannot be metered in its original form and cannot be distributed homogeneously in the reactor, because it is a paste.

However, the auxiliary is essential for smooth conduct of the production process during preparation of polyolefins, in order to provide reliable inhibition of caking, agglomeration, and blockages in reactors and in pipeline systems.

In order to obtain uniform distribution and a precise and exact metering rate for this antistatic auxiliary, the auxiliary was brought into contact with white oil obtainable as Winog 70 from the company Tudapedrol, Hamburg, and composed in essence of paraffins. A heat treatment was then carried out as follows in the presence of this medical white oil.

An amount of 12.5% by weight of the paste, based on the weight of the mixture composed of white oil and paste, was added cold to the white oil, and kept in motion using a suitable stirrer. The heat treatment was carried out via slow heating to a maximum of 40° C. After a period of 5 min, the paste had dissolved completely, and the mixture was then recooled, with gentle stirring. Surprisingly, the material which was initially a paste remained in solution here.

An amount in the range from 1 to 50 ppm, based on the polymer, of the resultant solution could then be metered by a suitable pump, e.g. a membrane metering pump, in accordance with the prescribed concentration for the production process, and could be homogeneously distributed in the reactor.

This method reliably eliminated the formation of chunks and lumps, and "hotspots".

Comparative Example C1

The amount used, and mixed with white oil, of the substance Grindsted PGE 0 80/D needed for polymer preparation was the same as in inventive example 1, and stirring was carried out over a period of 10 min, without heat treatment. Only a small portion of the paste dissolved here. The resultant mixture composed of dissolved portions and undissolved portions is per se not meterable. The dissolved portion of the mixture composed of white oil and auxiliary was then, as in inventive example 1, fed to the polymerization reaction, but after a period of as little as 35 min blockages occurred in the feed line due to the small concentration of antistatic auxiliary in the fluid portion, and prevented any further feed.

What is claimed is:

1. A process for the continuous feed of a polyglycerol ester to polymerization reaction of ethylene, propene, and other higher homologous olefins in the preparation of homo- and copolymers, without production of inhomogeneities, including lumps or chunks which are present because the condition of the polyglycerol ester is not suitable for precise metering, wherein the polyglycerol ester in paste or solid form is subjected, prior to feed, to a heat treatment in the presence of a solvent at a temperature of from 20 to 60° C., then recooled to ambient temperature after the heat treatment, and then fed to the polymerization reaction.

2. The continuous feed as claimed in claim 1, wherein the polymerization reaction is undertaken in a gas-phase reactor or slurry reactor.

3. A process for the continuous feed of antistatic agents to a polymerization reaction of ethylene, propene, and other higher homologous olefins in the preparation of homo- and copolymers, without production of inhomogeneities, including lumps or chunks which are present because the condition of the antistatic agents is not suitable for precise metering, wherein the antistatic agents in paste or solid form are subjected, prior to feed, to a heat treatment in the presence of a solvent at a temperature of from 20 to 60° C., then recooled to ambient temperature after the heat treatment, and then fed to the polymerization reaction, wherein the duration of the heat treatment is in the range from 10 s to 20 min.

4. The continuous feed as claimed in claim 1, wherein the solvent is a white oil.

5. The continuous feed as claimed in claim 1, wherein the feed of the polyglycerol ester takes place directly by way of a pump into a polymerization reactor or into a gas circuit.

6. The continuous feed as claimed in claim 1, wherein the solvent for the heat treatment is used in an amount in the range from 70 to 95% by weight based on the total weight of the polyglycerol ester and the solvent.

* * * * *